June 24, 1930.  W. W. NUGENT  1,767,856
FILTERING APPARATUS
Filed June 30, 1924  3 Sheets-Sheet 1
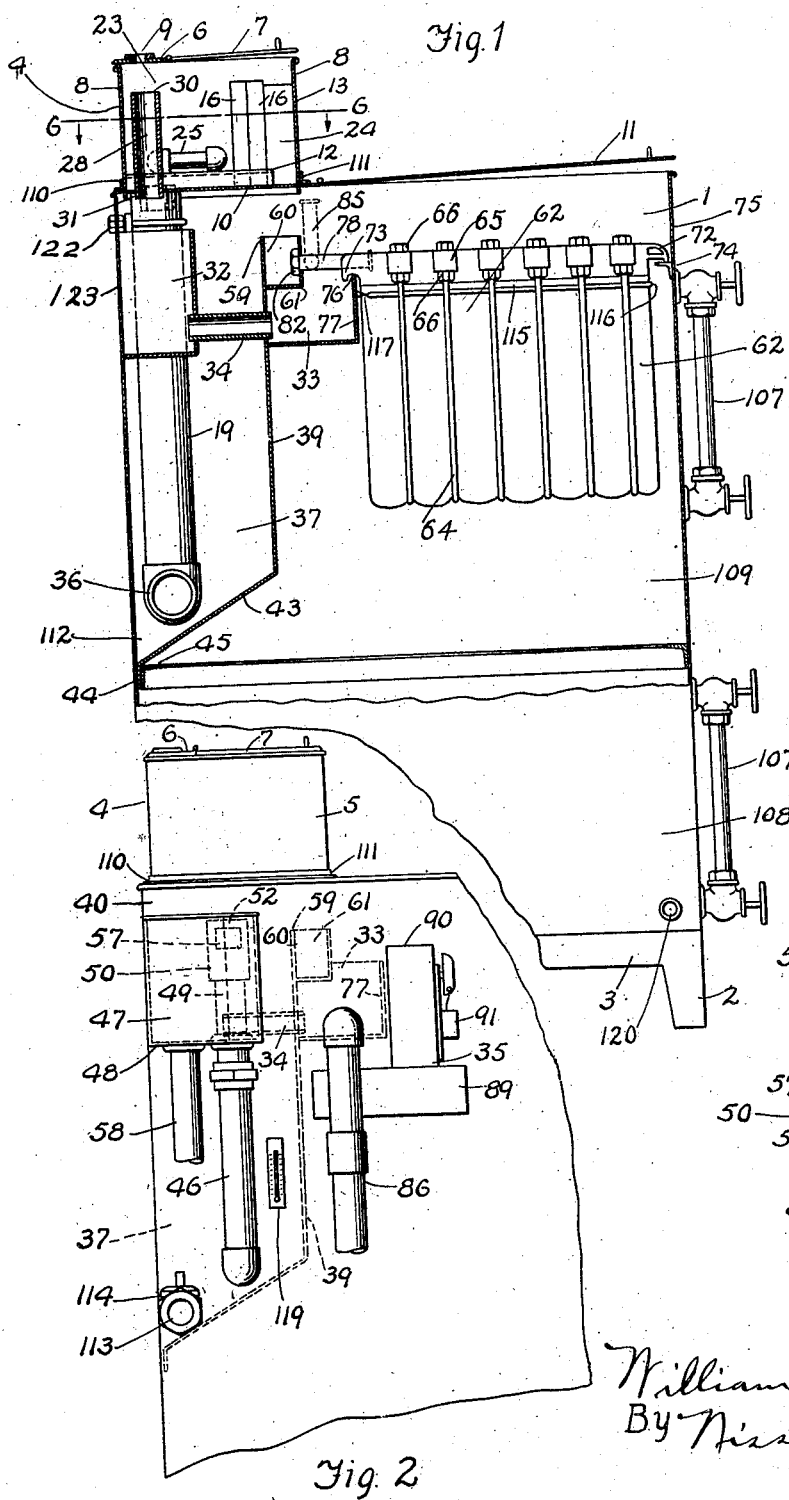

June 24, 1930.  W. W. NUGENT  1,767,856
FILTERING APPARATUS
Filed June 30, 1924  3 Sheets-Sheet 2
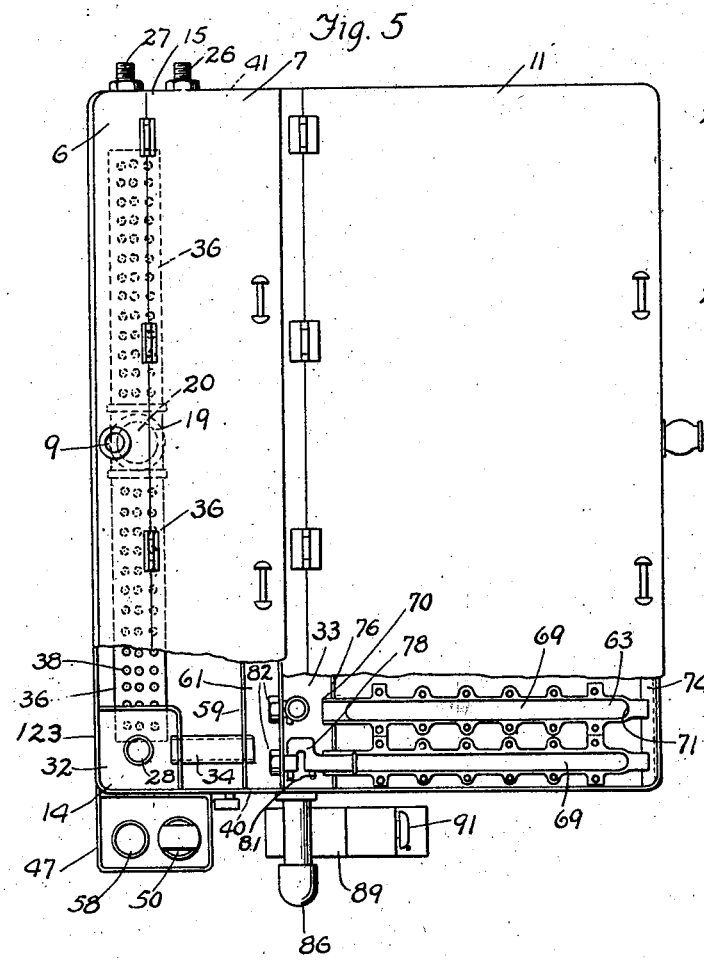
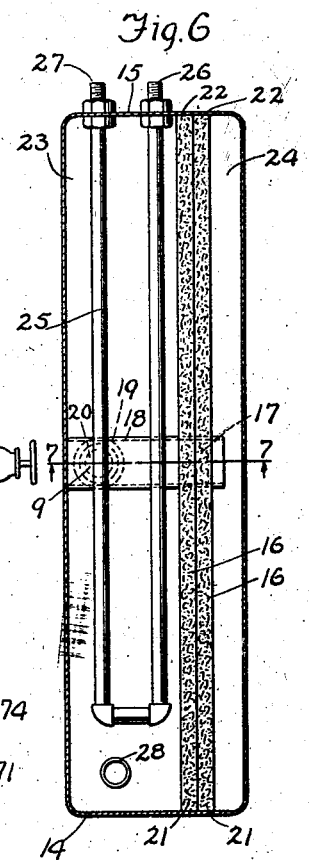
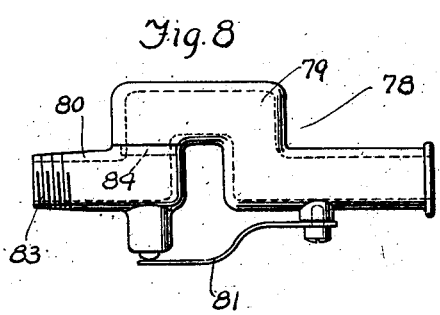
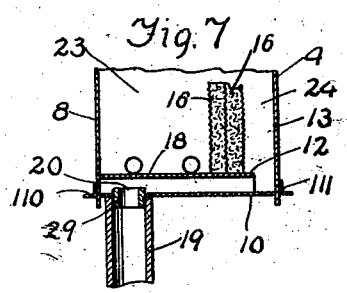
Inventor
William W. Nugent
By Nissen & Crane
Attys.

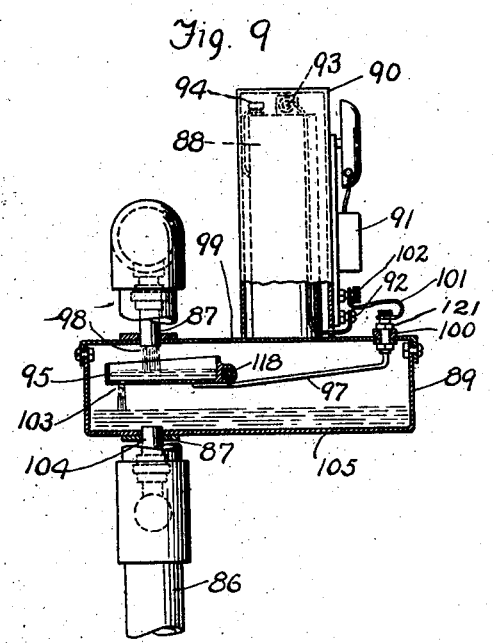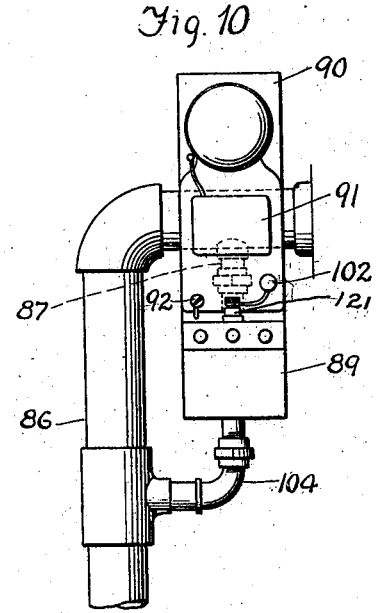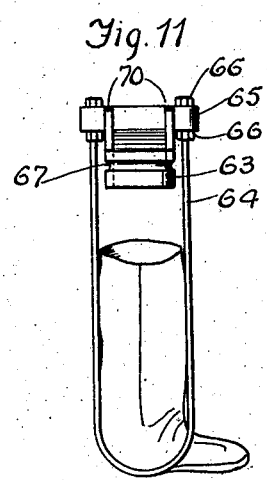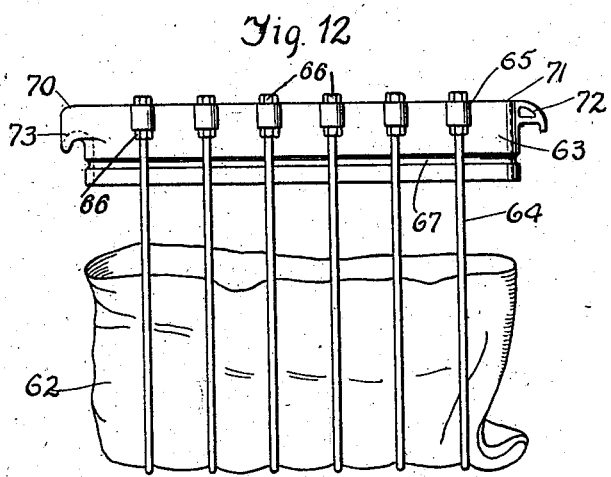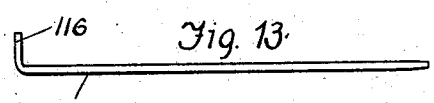

Patented June 24, 1930

1,767,856

UNITED STATES PATENT OFFICE

WILLIAM W. NUGENT, OF CHICAGO, ILLINOIS

FILTERING APPARATUS

Application filed June 30, 1924. Serial No. 723,158.

This invention relates to filtering apparatus adapted to remove impurities from a lubricant, particularly lubricating oil, and one of its objects is to provide a constant flow filtering device in an automatic lubricating system.

Another object of the invention is to provide, in a filtering apparatus, means for heating the fluid to that temperature required to kill disease germs therein.

In my co-pending application Serial No. 142,241, filed October 18, 1926, which is a division of this application, I have shown and claimed the filter element and its mounting.

A further object of the invention is to provide means for separately removing, first the large particles of impurities and later the smaller particles.

Another object of the invention is to provide heat for reducing the viscosity of fluids, such as oils, before subjecting the same to the filtering operation, thereby expediting the rate of filtration.

Another object of the invention is to provide a filtering device comprising a plurality of filter members, any one of the same being adapted to be removed and cleaned without impairing the operation of the remaining members.

A further object of the invention is to provide an alarm to give a warning when any portion of the filtering device is not operating properly and thus to prevent the wasteful overflow of oil.

A further object is the provision of filter elements having improved bag retaining means.

Another object of the invention is to provide an improved water separating mechanism in filtering apparatus for lubricating oils.

Another object of the invention is to provide an adjustable sight overflow to regulate the rate of flow of oil from the operating chamber.

Other objects of the invention will appear hereinafter, the novel features and combinations being set forth in the appended claims.

Referring to the accompanying drawings—

Fig. 1 is a sectional elevational view of my improved filtering apparatus;

Fig. 2 is an outside end elevational view of the filtering apparatus showing some of the interior compartments by dotted lines;

Fig. 3 is an elevation of an adjustable overflow device embodied in my invention;

Fig. 4 is a top plan view of the adjustable overflow shown in Fig. 3;

Fig. 5 is a top plan view of the filtering mechanism embodying my invention wherein a portion of the cover to the same is broken away to expose underlying parts;

Fig. 6 is a longitudinal sectional plan view taken on line 6—6 of Fig. 1;

Fig. 7 is a central transverse sectional view taken on line 7—7 of Fig. 6 looking in the direction of the arrows;

Fig. 8 is an enlarged plan view of a pivoted oil drip extension;

Fig. 9 is an enlarged elevation, partly in section, of alarm mechanism suitable for use in the apparatus shown in Figs. 1 and 2;

Fig. 10 is a front elevation of the alarm mechanism shown in Fig. 9; and

Figs. 11, 12 and 13 are detail views of the improved detachable filter bags, one of which is shown in elevation in Fig. 1.

Referring to Fig. 1 it will be seen that a cabinet or casing 1 made of suitable metal surrounds and contains the filtering and separating mechanism embodied in my invention. The cabinet is supported and elevated from the floor by short sheet metal legs 2 made integral with the base portion 3. A rectangular compartment 4 extending the full length of the cabinet, as shown in Fig. 5, has permanently attached thereto in any suitable manner longitudinal angle strips 110 and 111 to removably support such cabinet in a rectangular opening in the top of the casing 1. The compartment 4 protrudes above the cabinet 1 and comprises two sheet metal ends 5, a top comprising a metal strip 6 with a cover 7 hinged thereto, and two sheet metal walls 8, 8.

The compartment 4 is located at the rear portion of the top of casing 1 and is adapted to receive the incoming unfiltered oil through the fill opening 9 in the metal strip 6. It will be seen that the opening 9 is located centrally with respect to the length of the compartment 4 and back of the hinged cover 7. The top of the cabinet 1 comprises the bottom 10 of the compartment 4 and a cover 11 hinged in front of said compartment 4. This hinged portion or cover 11 may be lifted so as to permit inspection or adjustment of the filter devices contained in the tank 1.

The compartment 4 is substantially partitioned into two spaces by a longitudinally extending double filter 16. The filtering mechanism comprises spaced-apart walls of reticulated metal between which is placed removable filtering material consisting of any porous material having good filtering properties. It will be seen that this preliminary filtration is to remove the large, coarse particles of impurities. Thus it is advisable to employ only filtering material having large pores. By first removing the large, coarse particles and later removing the finer impurities, as hereinafter described, it is possible to increase the speed and rapidity of filtration.

Longitudinal filters 16—16 rest upon the bottom 10 of the compartment 4 and engaging the ends 14—15 of said compartment as shown in Fig. 6. A rectangular transverse slot 17 located centrally with respect to the length of said filter wall 16—16 is provided in the bottom of the same and extends through the entire thickness thereof. A rectangular trough 18 preferably consisting of sheet metal extends through the slots 17—17 and communicates with a vertically extending threaded nipple 29 fitting into the upper end of the pipe 19. The filter wall 16 extends vertically to a height slightly below the top of the compartment 4 and tightly engages the bottom 10 of the compartment 4 at all points except at the slots 17—17 where a liquid tight engagement is provided between the filter members 16—16 and the sides and ends of the trough 18. The ends 21—21 and 22—22 of the filter walls 16—16 also tightly engage the ends 14 and 15 of the compartment 4 respectively. Thus it is seen that the only passage available for the unfiltered lubricant that enters the back chamber 23 through the intake opening 9 to the same, is through the pores of the filter members 16—16. It will further be seen that the fluid portion and some of the small solid particles of the contaminated mixture passes through the filter members 16—16 and into the front chamber 24 of the casing 4.

It should be noted that the cover 7 is hinged to the uppermost removable section of the filtering apparatus in such position that when open and moved back the liquid to be filtered may be poured into the chamber 23 back of the upright filter walls 16, 16. Furthermore, the cover 7 may be opened whenever desired to permit inspection of the filtering material in the filter walls 16, 16 and the replenishing of the filtering material between the reticulated walls when such filtering material becomes so clogged with impurities that the rate of flow through the filter walls falls below the desired amount.

The steam coil 25 is provided in the back chamber 23 of the casing 4 and is supplied by means of external attachments 26 and 27 with a current of live steam. One of the purposes of the steam heating coil is to raise the temperature of the contaminated mixture to a degree high enough to kill all disease germs present in said mixture. This feature is especially desirable when the reclaimed oil is to be purified and used for lathe turning and similar work where workmen are continually subjected to serious infections in slight cuts and bruises on their hands. The steam heating coil is also applied to heat the mixture so as to reduce the viscosity of the lubricant and thus to expedite the filtration of the same. The oil in the upper chamber is preferably heated to a temperature of about 170 degrees F. to effect complete destruction of all disease germs and bacteria therein.

In Fig. 7 is shown the trough 18 communicating with the opening 20 at the top end of the threaded nipple 29. The threaded nipple 29 is screw-threaded through the bottom 10 of the casing 4 into the space provided by the trough 18 and fits loosely into the upper end of the pipe 19 which is clamped at 122 to the rear wall 123 of the main tank.

As shown in Fig. 1, the filtering members 16—16 do not extend vertically to the top of the casing 4, and to prevent overflowing of the contaminated mixture into the front chamber 24 of the casing 4, an overflow pipe 28 is provided. The overflow pipe 28 is a short vertically extending pipe located at the end of the casing 4 apart from the steam coil attachments 26 and 27. The top open end 30 of the overflow pipe extends vertically to a height slightly below the top of the filter members 16—16. The bottom end 31 of the overflow pipe 28 communicates with a small receiving chamber 32 located directly below the open end 31 of the overflow pipe 28. The bottom end 31 extends below the bottom 10 to direct dripping oil downwardly and prevent it spreading over the bottom of the casing 4. Thus it will be seen that in the event that the filter members 16—16 become clogged the dirty, contaminated mixture cannot flow over the tops of the filter members 16—16 but will be directed into the receiving chamber 32 at the end of the cabinet 1, from which it will flow through a short horizontal pipe 34 into a general overflow trough 33 as shown in Fig. 1. The overflowing lubricant is thence conducted to overflow alarm mechanism as hereinafter described.

The mixture passing through the trough 18 and into the vertically extending pipe 19 comprises oil, water and fine particles of impurities, the larger solid particles having been removed by the filter members 16—16. The mixture of oil, water and fine solid particles passes down a vertically extending tube 19 into a horizontally extending distributing tube 36. The horizontally extending tube or pipe 36 is attached at its central portion to the vertically extending pipe 19 by a T connection. This horizontally extending pipe 36 is located in a water separating chamber 37 as shown in Figs. 1 and 5, and is closed at its ends but provided with perforations 38 throughout its length for communication with said water separating chamber. Thus it will be seen that the mixture of oil, water and solid particles after being subjected to a preliminary filtration is ejected through the holes 38 into the bottom of the water separating chamber 37. This separating chamber extends the entire length of the tank 1 and is located at the bottom of the same. It comprises a front wall 39 preferably of sheet metal which is secured to the ends 40 and 41, respectively of the tank 1. Near the lower portion of the sheet metal comprising the front wall 39, the same is bent to provide a slanting bottom 43 to the water separating chamber 37. The bottom edge 44 of the sheet metal, comprising the front wall 39 and the bottom 43 of the water separating chamber, is disposed between the sheet metal comprising the back wall 29 of the tank 1 and an angular metal brace 45.

The oil and water entering the water separating chamber 37 through the perforations 38 each carries considerable solid material. In this separating chamber 37 the oil, due to its lower specific gravity, rises and forms a continuous layer on the top of the water. The water and the oil each retain a portion of the total solid material. That solid which is retained by the water is carried away or is deposited at the bottom of the separating chamber 37. The solid material retained by the oil is removed as hereinafter described. The sediment which collects in the bottom of the water separating chamber at 112 may be removed by inserting a cleaning tool through the opening 113 when the valve 114 is open.

As shown in Fig. 2, a pipe 46 connects the water overflow chamber 47 with the water separating chamber 37. The water overflow chamber 47 is located externally with respect to the cabinet 1 and is attached thereto, one wall of the chamber 47 engaging a portion of the end 40 of the tank 1. The pipe 46 extends through the bottom 48 of the water overflow chamber 47 and is tightly fastened thereto so as to provide a water tight joint. An extension 49 of the pipe 46 protrudes within the water overflow chamber 47 and is equipped with an adjustable overflow attachment 50. In Figs. 3 and 4 this adjustable overflow 50 is shown to consist of a cap 51 adjustably threaded on the pipe extension 49. The cap 51 is threaded internally to engage the threaded portion of the pipe 49. This cap is provided with a top 52 made integral with the threaded portion 53 and is provided with openings 54—54. Extensions 55—55 of the threaded sides 53 of the cap protrude over the openings 54—54 and are provided each with two flat edges 56—56 adapted to be engaged by a wrench or other turning tool. Thus it will be seen that the openings 54—54 in the cap 51 can be changed in elevation by screwing the cap 51 upwards or downwards as desired. A drain pipe 58, as shown in Fig. 2, is secured to the bottom of the water overflow chamber 47 and opens into said chamber. The drain pipe 58 is adapted to carry away the water and dirt that flows over into the water overflow chamber 47.

It has been pointed out that the oil in the water separating chamber 37 rises and forms a layer on top of the water. Some of the water rises within the pipe 46 which is attached externally to the water separating chamber 37 and opens thereinto. Thus there is a column of water within the pipe 46 balanced by a combined column of water and a layer of oil. It is well known that oil, having a lower specific gravity than water, would weigh less and that the combined column of oil and water would necessarily be higher than the balancing column of water alone. This principle is applied in causing the oil layer on the top of the water to flow over the edge 59 of the weir 60. The weir 60 is located at the upper end of the front wall 39 of the water separating chamber 37. This weir has in front of it a rectangular trough-shaped chamber 61 extending the entire length of the tank 1 and is adapted to receive the oil as it flows over the top edge 59 of the weir 60. It will be seen by referring to Fig. 1 that the weir trough 61 is smaller than the general overflow trough 33 and that it is located directly above the same so as to permit the oil that may overflow the weir trough 61 to flow into the general overflow trough 33.

The top edge 59 of the front wall 39 extends the entire length of the cabinet or tank 1 and thus provides a long weir that is capable of delivering large quantities of oil even though the layer passing over it is very shallow. It is highly desirable to have this layer of oil shallow because the impurities then have greater difficulty in flowing over the weir edge 59.

There is a continual flow of lubricant into the water separating chamber 37 and there may be a continual flow from the water overflow chamber 47 into the drain pipe 58. As the lubricant flows into the chamber 37 the oil flows over the weir 60.

The thickness of the layer of oil flowing over the weir 60 can be regulated as desired by raising or lowering the adjustable overflow 50. When the cap 51 is screwed upwards the overflow edges 57—57 shown in Fig. 4 are raised and a higher column of water is retained in the pipe 46, resulting in a correspondingly higher column of water in the water separating chamber 37. Since the height of the edge 59 of the weir 60 is fixed it is evident that the thickness or depth of the layer of oil at the edge 59 may be regulated by adjusting the height of the cap 51. The overflow edges 57 should be lower than the height of the weir edge 59, because the operation is based on the principle of the U-tube, one column of which has the layer of oil floating at the edge 59 and the other column of which is entirely water with its upper end at the edges 57. When the columns of liquid are in a state of equilibrium the water column beneath the edges 57 balances the other column beneath the edge 59 comprising the layer of oil and the water beneath it. Now as the mixture of oil and water comes into the separating chamber 39 the water overflows the edges 57 and the oil rises to the edge 59 and overflows this edge into the weir trough 61. It can readily be seen that when the cap 51 is lowered the water column beneath the overflow edges 57 is decreased in depth and this tends to decrease the depth of the water in the other column beneath the edge 59 and therefore the depth of the oil beneath the edge 59 is increased when the overflow edges 57 are lowered. When the weir edge 59 is approximately horizontal the cap 51 may be moved upwardly so as to decrease the depth of the layer of oil at the weir edge 59. In this manner the depth of the layer of oil flowing over the weir 60 may be regulated. The capacity is large on account of the length of the weir notwithstanding the shallow depth of the overflowing area. A plurality of filtering bags 62 are provided within the front portion of the cabinet or tank 1. The filter bags 62 are shown in Figs. 11 and 12 to be suspended from an elongated open frame 63 and to be restrained from bulging by a plurality of U-shaped metal loops or slings 64 secured at their upper ends to the frame 63 at 65. The upper ends of the U-shaped slings 64 are detachably connected to the frame 63 by means of the nuts 66—66, one above a projection 65 of the frame 63 and the other below said projection, both nuts engaging the same.

Extending around the frame 63 is an endless groove 67 to form keyways on the lateral sides of said frame 63. The key 115 shown in Fig. 13 is adapted to be grasped by the handle 116 and forced between the sides of the cloth bag 62 and the vertical rods 64 when the bag is pulled up so as to cover the groove 67 and consequently the opening in the frame 63. When the filter bags become filled with impurities extracted from the oil they may be turned inside out for the purpose of cleaning them in a suitable receptacle such as a pail having cleaning fluid therein for such purpose. This may be readily done by lifting out each filter element individually. The bags may thus be cleaned many times without removing them from the frames before they are worn out, after which a new bag may replace a worn out one by pulling the same from the position shown in Fig. 12 to position enclosing the lower portion of the frame 63. A wire or string 117 may then be tied around the open edge of the bag 62 in a position adapted to force a portion of the bag near its upper end into the groove 67. Two keys of the type shown in Fig. 13 may then be inserted so as to engage the exterior sides of the cloth comprising the upper edge of the bag; one key being inserted on each side of the frame 63. The keys are adapted to engage the U-shaped members 64 and are thus maintained tightly in contact with the cloth comprising the bag.

The frame 63 comprises two longitudinal sides 70—70 and two rounded ends 71—71 and is provided with an elongated opening 69 extending longitudinally from one end to the opposite end as shown in Fig. 5. Thus it will be seen that the lubricant may be introduced into the bags 62 through the openings 69 in the frame 63. A small projecting bracket 72 at one end and a spout 73 is provided at the opposite end of the frame 63. The frame and bag, when in the cabinet 1, are suspended as shown in Fig. 1 with the bracket 72 resting upon a longitudinal shelf or ledge 74 which is secured to the inner side of the front wall 75 of the tank 1. The spout 73 is adapted to rest upon the top edge 76 of the front wall 77 of the general overflow trough 33. It will be seen that the spout 73 is adapted to direct the oil, that may overflow from the bag 62, into the general overflow trough 33 as well as to cooperate with the bracket 72 in supporting the frame and bag. Thus provision is made for preventing wasteful loss of oil at such times when the bags become incapacitated and also prevents the mixing of unfiltered oil with filtered oil.

In my co-pending application, Serial No. 55,683, filed September 11, 1925, I have shown, described and claimed the filter element construction shown in Fig. 12, together with the means on the frames of the filter elements for spacing the bags a predetermined distance apart and holding the frames in position where they will register with intake openings from the source of supply of the oil or lubricant for the filter elements.

Referring again to Fig. 1, it is seen that the oil after being separated from the water flows from the weir 60 and into the weir trough 61. From the weir trough 61 the oil is conveyed through a pivoted oil drip extension 78, which communicates with the weir trough 61 and is secured to the front wall of the same. An enlarged plan view of the pivoted oil drip extension 78 is shown in Fig. 8 wherein the two portions 79 and 80 of said extension are shown assembled and held together by the spring clamp 81. The part 80 of the extension 78 is provided with threads 83 and is adapted to be screwed into the nut 82 shown in Figs. 1 and 5. The part 80 is in reality a pipe. A recess is provided in the sides surrounding the inner open end of the pipe 80 to engage a shoulder 84 made integral with the portion 79 of the extension. The surfaces of the two portions 80 and 84 which engage each other are machined true and smooth so as to afford a leak proof pivoted extension having the portion 80 adapted to remain fixed and the portion 79 adapted to be raised into a vertical position as shown by the dotted line at 85 of Fig. 1. When the bag 62 is in place the movable portion 79 of the extension 78 may be lowered from the position shown as 85 of Fig. 1 to the position shown at 78 of the same view. Thus it is possible to stop the flow of oil through the oil drip extension by rotating the portion 79 of the same into a vertical position, and by so doing the flow into any desired bag may be stopped so that such bag may be removed and replaced without impairing the operation of the filtering apparatus as a whole.

The general overflow trough 33 as shown in Fig. 1 is located in such a position that it can receive the overflow from the compartment 23 in the upper casing 4 back of the filter members 16—16. The trough 33 also receives the overflow from the weir trough 61 when the flow of oil into the system is excessive and the trough 33 is adapted to receive the overflow from the filter bags 62 when the same are not working properly. Thus provision is made to take care of all the oil that escapes.

The overflow pipe 86 communicates with the trough 33 and is located externally with respect to the cabinet or tank 1. This pipe 86 is provided to carry away the oil from the trough 33. A downwardly projecting branch pipe 87 is provided as shown in Figs. 9 and 10 to deliver some of the oil from the pipe 86 to the overflow alarm mechanism 90. The vertical pipe 87 communicates with the chamber 89 wherein a pivotally mounted pan 95 having a counterbalancing arm 97 is positioned to receive the oil discharged from the pipe 87. The pan 95 is located directly below an opening 98 in the pipe 87. Thus it will be seen that some of the overflow fluid from the general overflow trough 33 will flow through the vertical pipe 87 into the pan 95. The additional weight of the liquid in the pan 95 causes the same to be tilted down on the pivot 118 and also causes the counterbalancing arm 97 to be tilted upwards and to engage an insulated electric contact 121. The contact 121 is mounted on and extends through the top wall 99 of the rectangular box 89 and is electrically insulated from the same by insulation 100. This contact 121 is provided with a binding post which is electrically connected by a wire 101 to a terminal 102 of the electric bell mechanism 91. Thus it will be seen that normally the pan 95 is up and that the arm 97 is down with the bell circuit broken, but when the pan 95 receives oil from the pipe 87 the arm 97 attached to said pan establishes an electric contact with the binding post 121 completing an electric circuit from the terminal 93 of the dry cell 88 through the bell 91, switches 97, 121, and through the metal casing 99 to the outer terminal 94 of the dry cell. This causes the bell to ring to give an audible signal to warn attendants that the filtering device needs attention.

The source of electricity for the electric alarm mechanism or signalling mechanism may be a bell ringing transformer substituted for the dry cell if desired.

A restricted opening or hole 103 is provided in the bottom of the pan 95 to slowly drain the oil from the same. Therefore when the necessary adjustments have been made in the filter apparatus the supply of oil to the pan 95 will be discontinued and the oil in this pan will be slowly drained through the hole 103. The pan will then again resume its normal position automatically and the bell 91 will discontinue to ring. When the oil leaves the pan 95 it is collected in the bottom portion of the box 89 and from there it is returned to the large pipe 86 by means of a lower branch pipe 104 of the pipe 87 which opens into the box 89 through its bottom wall 105. It will thus be seen that the fluid actuated mechanism for the automatic overflow alarm is in a by-pass comprising the branch pipes 87 and 104.

When all the parts of the filtering mechanism are operating properly the incoming oil, water and impurities enter through the opening 9 into the top casing 4 and a mixture of water, oil and some finer impurities pass through the filter members 16—16, the larger particles being filtered out by the filters 16—16. This mixture, after passing through the filter members 16—16, flows through the rectangular passage 18 into the vertically extending pipe 19 which is supported from the rear wall 123 of the casing 1, as shown at 122 in Fig. 1. After passing into pipe 19 the oil passes into the horizontally extending pipe 36 and is distributed by perforations 38 throughout the length of the compartment 37 which is the water separating chamber. In the latter the oil rises and forms a layer on the top of the water. The oil passes over the edge 59 of the weir 60 and into the weir trough 61, while the water rises in the externally attached pipe 46 and flows through the adjustable overflow 50 into the water overflow chamber 47 to be carried away by the drain pipe 58.

From the trough 61 the oil is conveyed through the respective pivoted oil drip extensions 78 to the filter bags 62. The oil is then filtered by the cloth bags and flows into the lower storage compartment 108 of the cabinet 1. Two sight gauges 107, 107 are provided on the front of the cabinet 1, one located in a position adapted to indicate the height of the oil in the lower compartment 108 and the other to indicate the height of the oil when the same rises into the upper portion 109 of the cabinet 1. Two such gauges each comparatively short, are preferable to a long gauge, because a long gauge comprising a long tube of glass, is more likely to be broken when the front wall of the tank bends or bulges when filled with filtered oil. By providing two separate gauges at different elevations each may be made shorter and therefore the glass tube will not be broken when the sheet metal front wall bends adjacent the gauges.

While the top casing 4 may be permanently secured to the top of the cabinet or tank 1, it is preferable to provide the longitudinal angle strips 110 and 111, as shown in Figs. 1, 2 and 7, to support the casing 4 detachably in position. The casing 4, may therefore be readily removed to facilitate inspection when the bottom of the separating chamber 37 at 112 is to be cleaned by inserting a tool for that purpose through the opening 113 at one end of the trough 112.

It will also be noted that a suitable receptacle such as a pail may be provided for receiving the overflowing oil from the pipe 86 so that this oil may be poured into the compartment 24 of the top casing 4 after lifting the cover 7. A thermometer may be located at 119 as shown in Fig. 2, so that the flow of the steam into the pipe 25 in the top casing may be regulated for the purpose of killing germs in contaminated oil received at the intake 9 and also to regulate the viscosity so that flow and filtration may be facilitated. In an automatic lubricating system it is desirable to have the oil cooled before being supplied to the parts to be lubricated, and for this purpose cooling pipes may be supplied in the lower storage supply compartment 108. Thus the cool oil is far away from the warm oil. It will also be seen by referring to Fig. 1 that if the oil is not taken from the storage compartment 108 as fast as the oil is filtered the oil will gradually rise in the compartment 109. The rise of the oil in compartment 109 is limited, however, and cannot continue to such an extent as to let unfiltered oil into the compartment 39. When the depth of the oil in the compartment 109 reaches the upper edge of the trough 33 such oil will flow into such trough and thence to the overflow alarm mechanism. This arrangement also prevents overflow from the filtering apparatus on to the floor when the incoming oil greatly exceeds the amount taken from the supply compartment 108 by way of the exit opening 120.

As shown in Fig. 5, the filter elements 63 are individually supported and individually removable and there is a multiplicity of such filter elements. Before a filter element is removed its feed pipe 79 is turned up as shown in dotted lines in Fig. 1 at 85. Now if such a number of the feed pipes 79 should be required to be turned up that the remaining externally located pipes 79 cannot take the oil from the trough 61 as fast as the oil is received therein, the overflowing oil will be received in the trough 33 and thence flow into the overflow alarm mechanism to operate the latter. The front wall of the trough 61 is disposed distant from the front wall 77 of the trough 33 so that the front wall of the trough 61 may support the series of hinged overflow extensions 78 independently of the wall 77.

From the foregoing it will be seen that the filtering apparatus comprises an upper compartment 8 in which is located the pipes 25 for performing the double function of not only reducing the viscosity of the mixture of lubricant and impurities, but also to sterilize the same. The upper detachable compartment 8 contains a gravity filtering mechanism comprising the filter wall 16. The larger portions of the solid impurities are removed by the filter wall 16 after which the mixture passes by gravity through the trough or passageway 18 into the depending pipe 19 and thence through the perforations 38 into the water separating chamber 39. The oil floats to the top and flows over the edge 59 but on account of the small depth of the layer of oil on the water in the chamber 39 the weir edge assists in causing additional particles of impurities to be eliminated from the oil and settle to the bottom wall 43 of the water separating chamber.

The filtering apparatus is portable and comprises a tank or receptacle mounted on the base or support 3 having the metal legs 2. The angular metal brace 45 is entirely open, as shown in Fig. 1, so that there will be a free flow from the filter bags in the compartment 109 into the compartment 108. During normal operation the compartment 108 constitutes an oil reservoir mounted on the support 3 and the depth of the oil in this reservoir may be determined by inspection of the lower gauge 107. The upper gauge 107 is for the purpose of determining whether the oil in the tank, casing or cabinet 1 has reached such a depth as to submerge the filter bags. Inasmuch as it is desired to use this filtering apparatus in an automatic lubricating system provision is made to prevent the oil in the tank 1 from spilling out onto the floor. Such spilling is prevented by locating the overflow trough 33 beneath the upper edge of the tank 1. When the oil in the tank reaches the height of the edge 76 it will flow into the trough 33 and thence into the pipe 86 and when this occurs oil will flow through the by-pass pipe 87 and operate the alarm or signalling mechanism. If the filter walls 16 should become clogged and the oil in the receptacle 4 reaches such a depth that it will overflow the standpipe 28 the oil will flow from the receptacle 4 into the compartment 32 and thence through the pipe 34 into the trough 33 and operate the alarm mechanism. Furthermore, if the rate of flow of the oil over the rear edge 59 into the trough 61 is greater than the capacity of the filtering mechanism or when too many of the extensions 78 are moved to upright positions, the oil will overflow the weir trough 61 into the trough 33 and thence be directed to the alarm mechanism. Furthermore, if any of the filter bags become so clogged with impurities that they will not filter the oil as fast as it is received by the extensions 78 the oil will overflow the spouts 73 under the extension 79 into the trough 33 and thence be directed to the alarm operating mechanism. It can readily be seen by referring to Figs. 8 and 11 that the outer circumferentially flanged end of the extension 79 will rest on the edges 70 of the elongated bag holder thereby affording sufficient space underneath the extension 79 for the oil to flow from the spout 73 into the trough 33 when the oil overflows a filter bag.

When the alarm or signalling mechanism is operated it can readily be determined by opening the covers 7 and 11 what caused the alarm or signalling mechanism to operate. If one of the filtering bags needs attention the hinged extension 79 may be moved to upright position, as shown in Fig. 1, there being sufficient space provided for this purpose and when the extension is in its upright position it cannot overflow because its upper end is spaced above the weir trough 61. As shown in Fig. 5, each of the filter bags is separately removable and their frames are so constructed that they may be moved against each other so as to properly space them with respect to the hinged feed pipes 79.

Obviously those skilled in the art may make various changes in the details and arrangements of the parts without departing from the spirit of the invention as defined by the claims hereto appended, and it is therefore desired not to be restricted to the precise construction herein disclosed.

Having thus fully described and shown an embodiment of the invention, what I desire to be secured by Letters Patent of the United States is:

1. In a combined filtering and sterilizing apparatus for used lubricating oils, a receptacle into which the contaminated oil is introduced, means in said receptacle for raising the temperature of the oil to a degree sufficient to sterilize the same, means also associated with said receptacle for effecting a preliminary filtering of the oil, a water-separating receptacle into which the oil is introduced from said first-named receptacle, means in said water-separating receptacle for separating the water from the oil by flotation, and means for varying the depth of the water in the water-separating receptacle to regulate the flow of the oil separated therefrom.

2. In oil cleaning apparatus, the combination with water separating mechanism comprising a water separating chamber, of an elongated overflow weir for the oil floating on the water in said chamber, and adjustable mechanism in the water separating chamber for maintaining and regulating a shallow depth of oil on the water adjacent said weir to cause the oil to flow over the weir acting as a dam against larger sized solid impurities in the oil.

3. In filtering apparatus, the combination with a casing for receiving filtered oil, of a removable filter element mounted in said casing, and mechanism comprising a pivoted pipe for directing liquid to said filter element when mounted in said casing, said pivoted pipe being adapted to be moved to an upright position to stop the flow of the liquid therefrom while said filter element is removed from said casing.

4. In filtering apparatus, the combination with a receiving compartment, of an upright filter wall for filtering the material flowing therethrough from said compartment, a stand-pipe in said compartment with its upper open end at a level less than the height of said wall to receive the liquid before it overflows said wall, and means for receiving and directing to a predetermined position the liquid flowing into such standpipe.

5. In apparatus for cleaning oil, the combination with an oil reservoir, of filtering mechanism therein, means within the upper portion of said reservoir for preventing the depth of oil therein from exceeding a predetermined amount, and signaling mechanism adapted to be operated by oil flowing into such preventing means to indicate the tendency of the oil to overflow said reservoir.

6. In oil cleaning apparatus, the combination with an upper receiving compartment, of a filter wall therein, and an oil passageway for directing the oil after passing through said filter beneath the latter and thence to a position at the rear under side of said compartment.

7. In filtering apparatus, the combination with a filter element, of means for removably supporting the same in filtering position, and a hinged nozzle associated with said filter element and movable to an upright non-flowing position during removal of the filter element.

8. In filtering apparatus, the combination with a filter element, of means for supporting the same, a hinged pipe adjustable to position to direct liquid to said filter element, and means for directing overflow from said filter element.

9. In filtering apparatus, the combination with a filter element, of means for supporting said element, said supporting means comprising an edge of a trough at one end of said filter element, an adjustable device for directing liquid to said filter element, and means at one end of said filter element under said device for directing overflow from said filter element to said trough.

10. Oil cleaning apparatus comprising a weir, a weir trough, means for directing oil from said trough, overflow indicating mechanism, and means in position to receive overflow from said weir trough and direct such overflow to operate said overflow indicating mechanism.

11. Oil cleaning apparatus comprising an elongated weir, an elongated weir trough, means for directing oil from said trough, an additional elongated trough under said first-named trough in position to recive oil overflowing from the latter, and mechanism for directing the overflowing oil to a predetermined position.

12. In filtering apparatus, the combination with a plurality of individually removable filter elements, of a source of supply for said filter elements, and a plurality of directing pipes one for each of said filter elements and each movable to operative and inoperative positions relative to directing oil from said source of supply to said filter elements.

13. In filtering apparatus, the combination with filtering mechanism, of an overflow trough associated with said filtering mechanism to receive overflow therefrom, means comprising a trough for receiving oil and directing it to said filtering mechanism, said last-named trough being in position to direct overflow therefrom into said first-named trough, and overflow indicating mechanism operated by liquid received in said overflow trough either from said filtering mechanism or from said trough of said receiving means.

14. In filtering apparatus, the combination with a receiving compartment, of a filter therein, means for limiting the depth of liquid in said compartment and receiving overflow therefrom, water-separating mechanism, means for directing oil from said water-separating mechanism, additional filtering mechanism, means for receiving overflow from said additional filtering mechanism, and overflow indicating mechanism operable by the oil overflowing either from said receiving compartment or from said additional filtering mechanism.

15. In filtering apparatus, the combination with a plurality of individually removable filter elements, of a plurality of nozzles each pivoted on a horizontal axis and respectively associated with the filter elements and each movable to an upright non-flowing position during removal of the corresponding filter element, and means for directing flow of liquid to said nozzles and through the latter to the corresponding filter elements when the nozzles are in flowing positions.

16. In filtering apparatus, the combination with a plurality of removable filter elements, of a plurality of pipes for directing liquid into said filter elements, and hinged supports for said pipes to permit each of the latter to be swung upwardly to interrupt the flow therefrom to its filter element.

17. In filtering apparatus, the combination with a chamber, of an elongated weir for directing liquid from said chamber, an elongated trough associated with said weir, filtering mechanism, and multiple directing means from said elongated trough to said filtering mechanism.

18. In filtering apparatus, the combination with an elongated trough for receiving liquid, of a plurality of pipes connected to said trough, and a plurality of filter elements supported in position for respectively receiving liquid from said pipes.

19. In filtering apparatus, the combination with a trough, of a filtering element, means for directing liquid from said trough to said filtering element, an overflow trough, means for directing overflow from said filtering element into said overflow trough, and mechanism for supporting said first named trough in position to direct overflow therefrom into said overflow trough.

20. In filtering apparatus, the combination with a receiving trough, of an overflow trough, a filter element with one end thereof supported on the edge of said overflow trough, means for directing overflow from said filtering element to said overflow trough, means for directing liquid from said first-named trough to said filter element, and mechanism for mounting said first-named trough in position to direct overflow therefrom to said overflow trough.

21. In filtering apparatus, the combination with a receptacle for receiving filtered lubricating material, of receiving means for lubricating material to be filtered, mechanism for filtering and mechanism for directing the filtered lubricant into said receptacle, and an overflow trough in said receptacle for limiting the depth of the lubricant in said receptacle and preventing overflow of such lubricant from the receptacle.

22. In filtering apparatus, the combination with a receptacle for receiving filtered lubricant, of water separating mechanism comprising a water separating chamber in the upper portion of said receptacle, an elongated trough in said receptacle, an elongated weir for directing separated lubricant from said water separating chamber into said elongated trough, an overflow trough in said receptacle below said first-named trough, a plurality of removable filter elements, means for supporting said filter elements in said receptacle, mechanism for directing overflow from said filter elements into said overflow trough, a plurality of pipes one for each of said filter elements, and hinged connections between said pipes and said first-named trough to permit each pipe individually to be swung up to interrupt the flow of lubricant from said first-named trough to its corresponding filter element when the latter is to be removed from said receptacle.

23. In oil cleaning apparatus, the combination with a top compartment adapted to receive a mixture of lubricant and impurities, of a filter in said receiving compartment, means for limiting the depth of liquid in said receiving compartment and directing overflow therefrom before such liquid overflows said filter, water-separating mechanism comprising an elongated weir, a weir trough, additional filtering mechanism, means for directing oil from said weir trough to said additional filtering mechanism, an overflow trough in position to receive overflow either from said weir trough or from said additional filtering mechanism, connections for directing overflow from said receiving compartment to said overflow trough, and overflow indicating mechanism operable by liquid received by said overflow trough to indicate either overflow from said receiving compartment or from said weir trough or from said additional filtering mechanism.

24. In filtering apparatus, the combination with a plurality of individual removable filter elements, of a plurality of hinged pipes one for each of said filter elements and each adapted to be swung into upright and inoperative positions, and means for supporting said filter elements in position to register with said pipes when the latter are in their lower and operative positions.

25. In filtering apparatus, the combination with a plurality of individual removable filter elements, of a plurality of hinged pipes one for each of said filter elements and each adapted to be moved into operative and inoperative positions, and a trough to which said pipes are connected to serve as a source of multiple supply therefor.

26. In filtering apparatus, the combination with a plurality of individual removable filter elements, of an overflow trough, overflow spouts for directing liquid from said filter elements to said overflow trough, an intake trough, a plurality of hinged nozzles for directing liquid from said intake trough to said filter elements, said members being individually movable to uprght non-flowing positions during removal of corresponding filter element, and means for supporting the ends of the filter elements remote from the overflow spouts in position to receive liquid from said nozzles when the latter are down in flowing positions.

27. In filtering apparatus, the combination with a receptacle for containing filtered lubricant, of filtering mechanism comprising a plurality of individual removable filtering elements, means for limiting the depth of lubricant in said receptacle and also receiving overflow from any of said filter elements, and overflow alarm mechanism for indicating either the overflow from any of said filter elements or that the lubricant in said receptacle has reached a predetermined depth.

28. In filtering apparatus, the combination with preliminary filtering mechanism for removing the coarser ingredients from the lubricant to be filtered, of additional filtering mechanism for removing the finer ingredients from the lubricant, and mechanism for giving an indication when the capacity of the preliminary filtering mechanism is being exceeded.

29. In filtering apparatus, the combination with a receptacle for containing filtered oil, of primary filtering mechanism, water separating apparatus in said receptacle in position to receive a lubricant from said primary filtering mechanism, an elongated trough, a weir for directing a film of oil from said water separating apparatus to said elongated trough, auxiliary filtering mechanism in said receptacle, means for directing the oil from said elongated trough to said auxiliary filtering mechanism, an overflow trough in position to receive oil from said receptacle when the depth therein exceeds a certain predetermined amount, said overflow trough also being in position to receive overflow from said auxiliary filtering mechanism and also from said elongated trough, connections for directing overflow from said primary filtering mechanism to said overflow trough, and overflow alarm mechanism connected to said overflow trough to indicate that the filtering capacity of either the primary or the auxiliary filtering mechanisms is being exceeded or that the auxiliary filtering mechanism is overflowing or that the depth of oil in the said receptacle has exceeded the predetermined amount.

In testimony whereof I have signed my name to this specification on this 27th day of June, A. D. 1924.

WILLIAM W. NUGENT.